United States Patent Office 2,780,623
Patented Feb. 5, 1957

2,780,623

METHOD OF PREPARING THIOAMMELINE

Richard Parke Welcher and Donald W. Kaiser, Old Greenwich, Conn., assignors to American Cyanamid Company, New York, N. Y., a corporation of Maine No Drawing. Application November 12, 1954,
Serial No. 468,568

6 Claims. (Cl. 260—249.8)

The present invention relates to the preparation of thioammeline and more particularly to the preparation of this product from dicyandiamide and ammonium thiocyanate.

In accordance with this invention it has been found that thioammeline may be readily prepared by reacting dicyandiamide with ammonium thiocyanate in an inert organic solvent. The product is not only obtained in good yields but the process is one whereby this important compound may be produced on a commercial scale.

While the reaction between the dicyandiamide and ammonium thiocyanate may be carried out over a wide range of temperatures, it is preferred to operate at a temperature within the range of from about 50° C. to about 250° C., and more preferably from about 100° C. to 200° C.

Examples of inert organic solvents for the reaction include dioxane, acetonitrile, aliphatic ketones, the lower aliphatic monohydric alcohols and the lower monoalkyl ethers of ethylene glycol.

Although the dicyandiamide and ammonium thiocyanate are preferably employed in equimolar quantities, either reactant may be used in excess without effecting the yield of the product.

The invention is further illustrated, but not limited, by the following examples:

*Example 1*

A mixture of 22 g. (0.26 mole) of dicyandiamide, 21 g. (0.28 mole) of ammonium thiocyanate and 100 g. of methyl isobutyl ketone was heated to reflux (108–117° C.) for six hours. Ammonia evolved during the reaction. The resulting slurry was cooled and filtered. The product was washed with methyl isobutyl ketone and dried at room temperature, giving 22.2 g. of crude thioammeline. The crude product was recrystallized from water and then examined by infra-red spectrometry. It was found to be pure thioammeline.

*Example 2*

A mixture consisting of 22 g. of dicyandiamide, 21 g. of ammonium thiocyanate and 100 g. of butyl alcohol was heated at 119–121° C. with stirring for a period of 6.3 hours. Ammonia evolved during the reaction. The resulting slurry was cooled to 20° C. and filtered. The precipitate was washed with hot water and dried at 110° C., giving 19.7 g. of thioammeline.

*Example 3*

A mixture of 22 g. of dicyandiamide, 40 g. of ammonium thiocyanate and 100 g. of the monoethyl ether of ethylene glycol was heated at 135–136° C. with stirring for a period of 6.9 hours. Ammonia evolved during the reaction. The slurry was cooled to 15° C. and filtered. The crude product was washed with hot water and then dried in a vacuum desiccator over sulfuric acid. 16.9 g. of pure thioammeline was obtained.

*Example 4*

A mixture consisting of 22 g. of dicyandiamide, 21 g. of ammonium thiocyanate and 50 g. of acetonitrile was heated at reflux (83–84° C.) for six hours. Ammonia evolved during the reaction. The resulting slurry was cooled to room temperature and filtered, giving 23.1 g. of crude product.

One of the outstanding advantages in the preparation of thioammeline in accordance with this invention is that the product is readily obtained without the occurrence of any appreciable amount of side reactions. The compound is collected in substantially pure form, and is particularly useful as an intermediate for the preparation of substituted melamines.

While the invention has been described with particular reference to specific embodiments, it is to be understood that it is not to be limited thereto but is to be construed broadly and restricted solely by the scope of the appended claims.

We claim:

1. The method of preparing thioammeline which consists in bringing together substantially equimolecular proportions of dicyandiamide and ammonium thiocyanate in an inert organic solvent at a temperature within the range of from about 50° C. to about 136° C., and recovering thioammeline from the resulting mixture.

2. The method of claim 1 wherein the solvent is an aliphatic ketone.

3. The method of claim 1 wherein the solvent is methyl isobutyl ketone.

4. The method of claim 1 wherein the solvent is butyl alcohol.

5. The method of claim 1 wherein the solvent is monoethyl ether of ethylene glycol.

6. The method of claim 1 wherein the solvent is acetonitrile.

References Cited in the file of this patent

UNITED STATES PATENTS 2,262,935   Hill _____ Nov. 18, 1941

FOREIGN PATENTS 456,843   Canada _____ May 24, 1949

OTHER REFERENCES

Berichte: vol. 18, p. 3106 (1885).
Karrer: Org. Chem., 3rd ed., p. 224 (1947).